United States Patent [19]

Okano et al.

[11] Patent Number: 4,963,851

[45] Date of Patent: Oct. 16, 1990

[54] TEMPERATURE SENSOR

[75] Inventors: Teruo Okano, Honjo; Tomomi Nagata, Tokyo, both of Japan

[73] Assignee: Nibex Co., Ltd., Tokyo, Japan

[21] Appl. No.: 242,384

[22] Filed: Sep. 9, 1988

Related U.S. Application Data

[62] Division of Ser. No. 72,206, Jul. 10, 1987, Pat. No. 4,893,945.

[30] Foreign Application Priority Data

| | | | |
|---|---|---|---|
| Jul. 11, 1986 | [JP] | Japan | 62-1090 |
| Dec. 2, 1986 | [JP] | Japan | 61-185044 |
| Dec. 27, 1986 | [JP] | Japan | 61-199832 |

[51] Int. Cl.[5] .................... G01K 05/48; H01H 37/46

[52] U.S. Cl. .................... 337/395; 60/527; 374/111; 374/141

[58] Field of Search .................... 374/187, 188, 111; 200/33 R, 61.93, 264, 332.1; 337/393, 394

[56] References Cited

U.S. PATENT DOCUMENTS

| | | | |
|---|---|---|---|
| 1,416,851 | 5/1922 | McNeil | 337/394 X |
| 2,390,948 | 11/1945 | Koci | 337/393 X |
| 2,755,349 | 7/1956 | Silvers | 200/33 R |
| 2,990,716 | 7/1961 | Butts | 337/393 X |
| 3,040,581 | 6/1962 | Grayson | 60/527 |
| 3,423,714 | 1/1969 | Adam | 337/394 X |
| 3,634,638 | 1/1972 | Evan-Tov | 200/61.93 |
| 3,912,893 | 10/1975 | Stoler | 200/61.93 |
| 4,197,440 | 4/1980 | Debaigt | 200/232.1 |
| 4,295,699 | 10/1981 | DuRocher | 338/99 X |
| 4,541,735 | 9/1985 | Ibu-Isa | 337/393 X |
| 4,695,816 | 9/1987 | Essig et al. | 337/382 X |
| 4,742,189 | 5/1988 | Carter et al. | 200/33 R |

*Primary Examiner*—Daniel M. Yasich

*Attorney, Agent, or Firm*—Pollock, VandeSande & Priddy

[57] ABSTRACT

A temperature sensor having a heat sensing portion including silicone rubber having thermal expansion and contraction characteristics which are linear with respect to changes in temperature, and an responsively operating portion adapted to operate by thermal expansion and contraction of the silicone rubber. The silicone rubber expands as the ambient temperature around the heat sensing portion rises, and the silicone rubber contracts as the ambient temperature decreases. The operating portion operate in response this expansion or contraction, thereby detecting the temperature change.

7 Claims, 5 Drawing Sheets

RESULTS OF TEST FOR CONFIRMING FUNCTIONING OF THERMO SWITCH (60°C)

| NO. OF OPERATION \ SAMPLE NO. | NO. 1 | NO. 2 | NO. 3 |
|---|---|---|---|
| 1 | 60.3 | 59.5 | 60.2 |
| 2 | 59.8 | 59.5 | 59.7 |
| 3 | 60.0 | 60.3 | 59.7 |
| 4 | 59.3 | 60.7 | 59.0 |
| 5 | 59.0 | 60.3 | 59.2 |
| 6 | 59.8 | 60.6 | 58.7 |
| 7 | 58.5 | 60.4 | 59.3 |
| 8 | 60.1 | 59.4 | 59.6 |
| 9 | 59.5 | 60.0 | 59.3 |
| 10 | 59.7 | 59.6 | 59.8 |
| MAX/MIN | 60.3/58.5 | 60.7/59.5 | 60.2/58.7 |
| $\bar{X}$ | 59.6 | 60.0 | 59.5 |
| $\delta n-1$ | 0.544 | 0.495 | 0.435 |

FIG. 5

RESULTS OF TEST FOR CONFIRMING FUNCTIONING OF THERMO SWITCH (60°C)

| NO. OF OPERATIONS \ SAMPLE NO. | NO. 4 | NO. 5 | NO. 6 |
|---|---|---|---|
| 1 | 64.4 | 65.0 | 64.8 |
| 2 | 64.2 | 63.6 | 65.6 |
| 3 | 64.5 | 64.5 | 64.9 |
| 4 | 65.3 | 63.9 | 64.9 |
| 5 | 64.3 | 64.7 | 65.4 |
| 6 | 64.7 | 63.8 | 64.3 |
| 7 | 64.4 | 64.2 | 64.7 |
| 8 | 65.0 | 64.2 | 64.5 |
| 9 | 64.8 | 63.8 | 65.2 |
| 10 | 64.5 | 65.0 | 64.9 |
| MAX/MIN | 65.3/642 | 65.0/63.6 | 65.6/64.3 |
| $\bar{X}$ | 64.6 | 64.3 | 64.9 |
| $\delta n-1$ | 0.341 | 0.510 | 0.394 |

FIG. 6

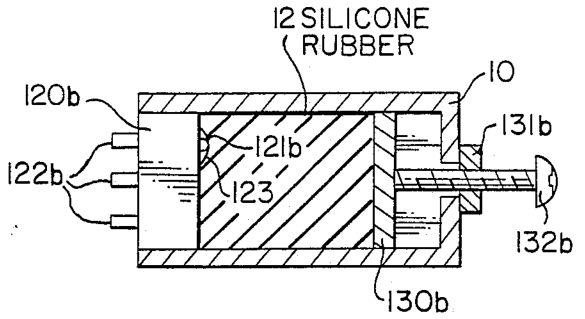
FIG. 13
FIG. 14
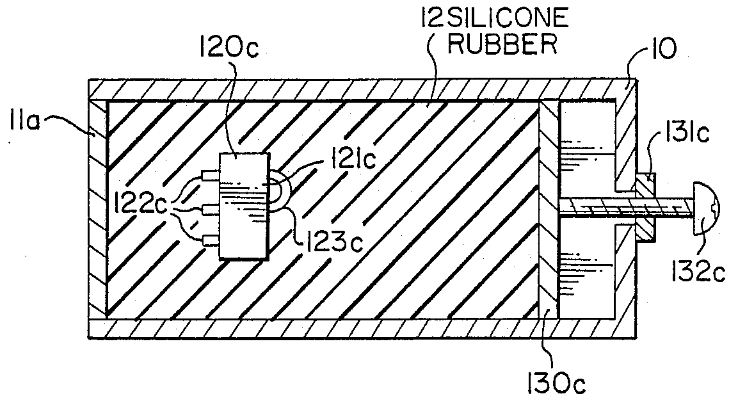
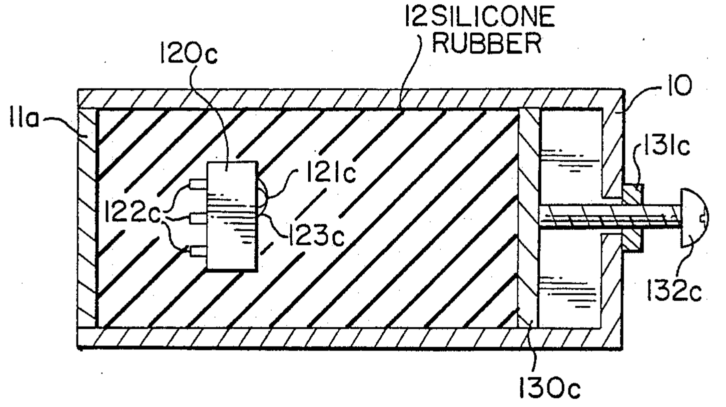
FIG. 15

TEMPERATURE SENSOR

This is a divisional of application Ser. No. 072,206, filed on July 10, 1987, now U.S. Pat. No. 4,893,945.

BACKGROUND OF THE INVENTION

This invention relates to a temperature sensor for detecting the ambient temperature and, more particularly, to a temperature sensor which is designed to accurately detect temperature change by utilizing the thermal expansion and compression characteristics of a silicone rubber which are linear with respect to changes in temperature.

A proposed type of temperature sensor is constituted by a base plate, a thermally-expandable expanding agent coating applied to the base plate, a movable contact attached to the expanding agent coating, and a fixed contact disposed within the range of movement of the movable contact. In this temperature sensor, the movable contact is brought into electrical contact with the fixed contact by the thermal expansion of the expanding agent coating, thereby detecting a change in temperature (Japanese Utility Model Application No. 202539/1985).

This conventional temperature sensor is advantageous in that its shape and the distance between the contacts can be freely changed, and it is small and inexpensive. This sensor, however, cannot accurately detect temperature changes because the expansion characteristics of the expanding agent coating are not linear with respect to a rise in temperature. Also, it is not possible to reuse this temperature sensor since, once the expanding agent coating has expanded, it cannot contract again. Moreover, there is a possibility that the expanding agent coating will be activated at an ordinary temperature below the set temperature and, therefore, this type of sensor lacks stability and needs to be handled carefully.

SUMMARY OF THE INVENTION

It is a primary object of the present invention to provide a temperature sensor having: a heat sensing portion containing silicone rubber having thermal expansion and contraction characteristics which are linear with respect to changes in temperature; and a detecting and operating portion adapted to operate in response to the magnitude of the thermal expansion or contraction of the silicone rubber. In this temperature sensor, the silicone rubber linearly expands or contracts in response to a wide range of changes in temperature, thereby ensuring that the sensor can detect any change in temperature over a wide range with a high degree of accuracy, in a suitable manner. The temperature sensor in accordance with the present invention is easy to handle during transportation or manufacture because the properties of silicone rubber are more stable than those of the expanding agent coating, and it can be reused because the silicone rubber is capable of repeatedly expanding and contracting, irrespective of the number of times it operates.

It is another object of the present invention to provide a temperature sensor in which the detecting and operating portion is constituted by a switching device having a movable contact in association with the silicone rubber and a fixed contact attached to the case in such a manner that the position of the fixed contact can be changed so as to adjust the distance between the movable and fixed contacts. In this temperature sensor, the operation of correcting any error in the set temperature, or altering the set temperature, can be effected by adjusting the distance between the fixed contact and the movable contact.

It is still another object of the present invention to provide a temperature sensor in which the detecting and operating portion is constituted by a microswitch having a main body fixed to the case and an actuator located within the range of expansion of the silicone rubber. In this temperature sensor, the contact for providing electrical communication is accommodated in the main body of the microswitch and hence is separate from the silicone rubber, thereby eliminating the possibility of imperfect contact between the contact points and making it possible to detect any change in temperature with improved accuracy.

It is a further object of the present invention to provide a temperature sensor having an adjustable pressurizing portion capable of applying a suitable pressure to the silicone rubber. This temperature sensor enables the operation of correcting a very small error in the value of a set temperature after manufacture, or of altering the set temperature.

Other objects, constructions and advantages of the present invention will be clear upon reading the following description.

BRIEF DESCRIPTION OF THE DRAWINGS

FIG. 5 is a table of the results of tests for confirming the functioning of thermal switches at 60° C.;

FIG. 6 is a table of the results of tests for confirming the functioning of thermal switches at 65° C.;

FIG. 13 is a cross-sectional view of the thermal switch shown in FIG. 12 when it is in an on state;

FIG. 14 is a cross-sectional view of a thermal switch which represents a sixth embodiment of the present invention and which is in an off state; and FIG. 15 is a cross-sectional view of the thermal switch shown in FIG. 14 which is in an on state.

DESCRIPTION OF THE PREFERRED EMBODIMENTS

Figure 1:
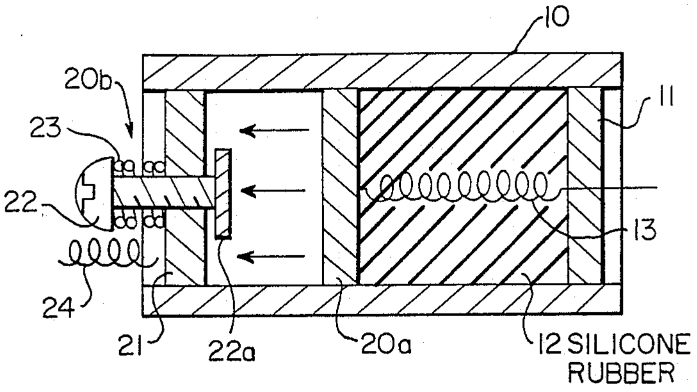
FIG. 1 is a cross-sectional view of a thermal switch which represents a first object of the present invention and which is in an off state.
Figure 2:
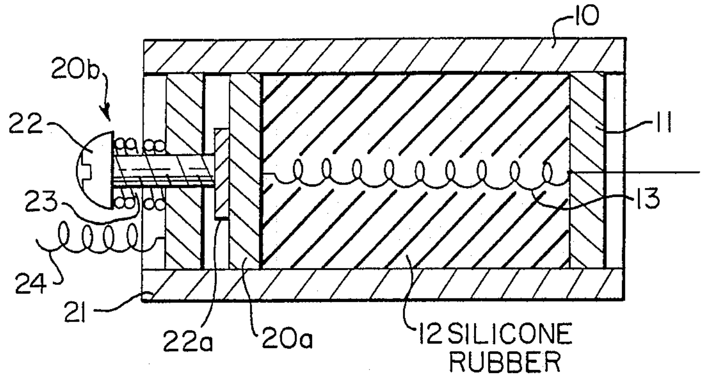
FIG. 2 is a cross-sectional view of this thermal switch shown in FIG. 1 when it is in an on state.

FIGS. 1 and 2 show a thermal switch which represents a first embodiment of the present invention. This thermal switch is provided with a tubular heat-conductive case 10, a heat-conductive base plate 11 fixed to one end of the case 10, a movable contact member 20*a* attached to an intermediate portion of the case 10 so as to be movable in the axial direction thereof, silicone rubber 12 which fills the space between the heat-conductive base plate 11 and the movable contact member 20*a* and which forms an elastic solid body which has superior oilproofing, heat resistance, low temperature resistance, electrical insulating, and thermal expansion properties.

Figure 3:
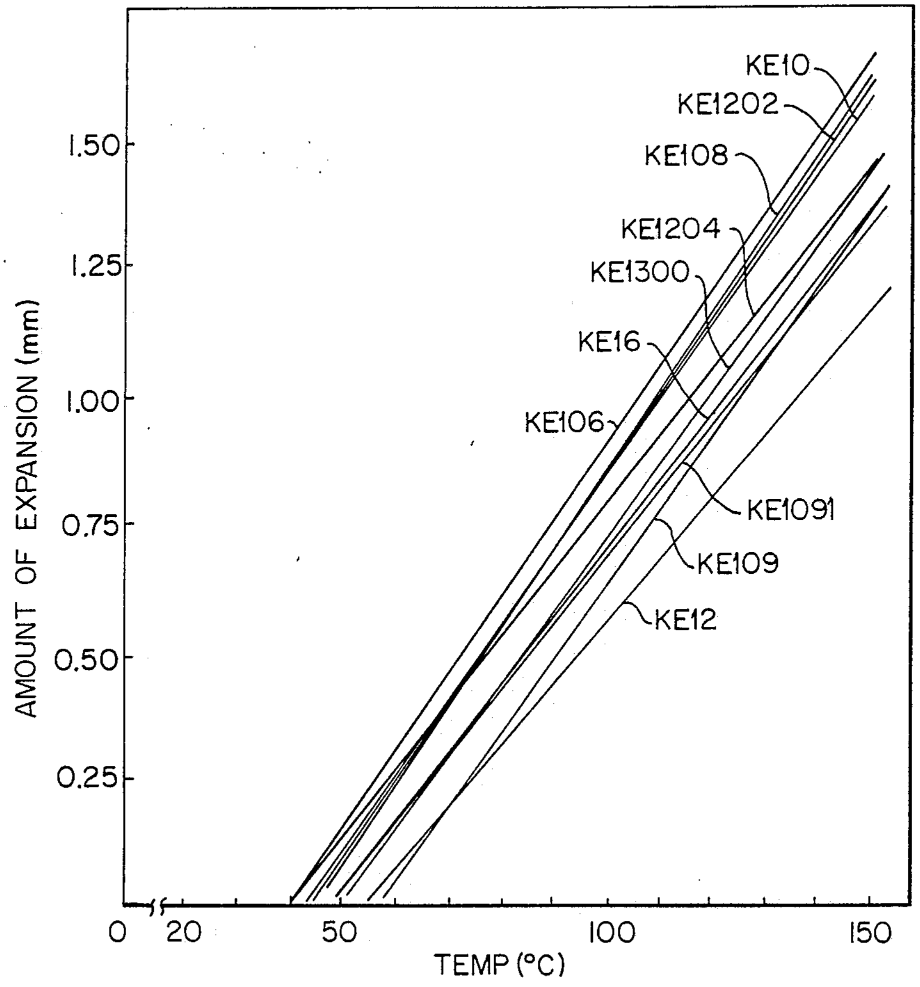
FIG. 3 is a graph of experimental data on the expansion of silicone rubber with temperature.
Figure 4:
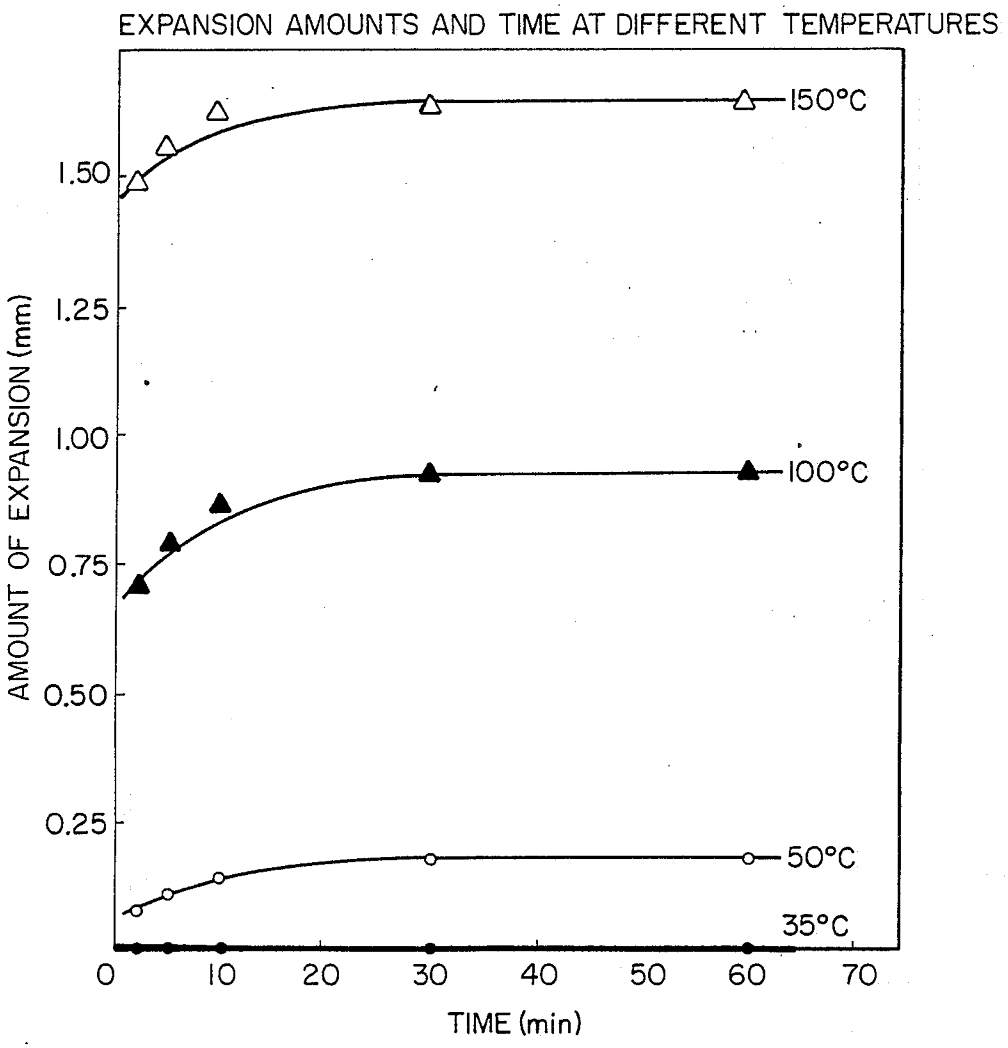
FIG. 4 is a graph of experimental data on the expansion of silicone rubber with time.

Examples of the material provided as the silicone rubber 12 are KE16, KE1091, KE1202, KE108, KE106, KE109, KE10, KE1300, KE12, and KE1204 (commercial names, products of Shin-Etsu Chemical Co., Ltd.). FIG. 3 shows experimental data on the thermal expansion of each product with respect to temperature. In FIG. 3, the ordinate represents expansion (mm) and the abscissa represents temperature (°C.). As is apparent from FIG. 3, each product starts to expand at a temperature within the range of 40° to 50° C. and displays an extremely linear increase in expansion with respect to temperature rise above this temperature range. FIG. 4 shows experimental data on the thermal expansion of KE10 while it is stabilizing with time. In FIG. 4, the ordinate represents expansion (mm) and the abscissa represents time (min.). As will be understood from FIG. 4, it takes 30 to 60 minutes for the material to reach its maximum expansion and, after this period of time, the material is in an equilibrium state.

One end of a lead wire 13 which is capable of expanding and contracting is connected to the surface of the movable contact member 20*a* facing the base plate 11 and the wire is led to the outside through the base plate 11.

A fixed contact member 20*b* which is disposed at the other end of the case 10 is constituted by an electrically conductive flat plate 21 fixed to the case 10, and an electrically conductive screw 22 which is screwed through the flat plate 21 and which has a conductive contact piece 22*a* attached to its top end facing the movable contact member 20*a*. One end of a lead wire 24 is connected to the outer surface of the flat plate 21. The heat-conductive base plate 11, the silicone rubber 12 and the heat-conductive case 10 constitute a heat sensing unit, and the movable contact member 20*a* and the fixed contact member 20*b* constitute an operation unit which acts as a switching device.

The operation of the first embodiment of the present invention will be described below with reference to FIGS. 1 and 2. As the outside temperature rises so that the temperature of the silicone rubber 12 is increased by the effect of heat conduction, the silicone rubber 12 gradually expands. In response to this expansion, the movable contact member 20*a* moves toward the fixed contact 20*b* and is pressed against the contact piece 22*a* of the fixed contact 20*b*, thereby turning on the thermal switch. As the outside temperature decreases, the temperature of the silicone rubber 12 also decreases so that the silicone rubber 12 contracts and disconnects the movable contact member 20*a* from the contact piece 22*a* of the fixed contact 20*b*, thereby turning off the thermal switch.

FIG. 5 shows the results of a repetitive operation test in which three thermal switches of the above-described construction incorporating fillings of silicone rubber KE10 were operated 10 times at a set temperature of 60° C. FIG. 6 shows the results of another repetitive operation test in which three thermal switches of the above-described construction incorporating fillings of silicone rubber KE10 were operated 10 times at a set temperature of 65° C. As is apparent from FIGS. 5 and 6, the difference between the maximum operating temperature and the minimum operating temperature is small and desirable values of average (x) and standard deviation ($\sigma_{n-1}$) were obtained, ensuring improved reproducibility and accuracy.

In the first embodiment, it is possible to make the thermal switch operate at a lower set temperature by tightening the screw 22 constituting the fixed contact member 20*b* so as to bring the contact piece 22*a* closer to the movable contact member 20*a*, and it is similarly possible to make the thermal switch operate at a higher temperature by unscrewing the screw 22 from the plate and moving the contact piece 22*a* away from the movable contact 20*a*. In addition, this thermal switch can be reduced in size since it is possible to freely change its shape and size by adjusting the amount of silicone rubber 12 enclosed in it, and it can easily be handled during transportation or manufacture since the properties of silicone rubber are stable.

Figure 7:
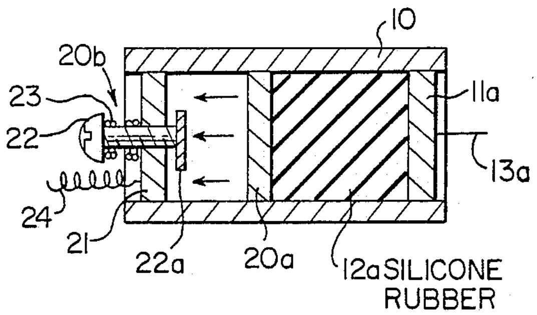
FIG. 7 is a cross-sectional view of a thermal switch which represents a second embodiment of the present invention.

FIG. 7 shows a second embodiment of the present invention which is provided with silicone rubber 12*a* which is electrically conductive and thermally expansive, and which fills the space formed between a base plate 11*a* made of a thermally and electrically conductive material and a movable contact member 20*a*. One end of a lead wire 13*a* is connected to the outer surface of the base plate 11*a*.

Since, in the second embodiment of the present invention, the end of the lead wire 13*a* is connected to the outer surface of the base plate 11*a*, it is possible to easily repair any imperfect contact of the lead wire 13*a* such as that due to a break in the wire.

The constructions, operations and functions of portions of this second embodiment which have not been described are the same as those in the first embodiment.

As described above, the thermal switch in accordance with the present invention can be reduced in size and weight and can therefore be used by being incorporated in, for example, a calendar, a clock, a picture, and so forth.

Figure 8:
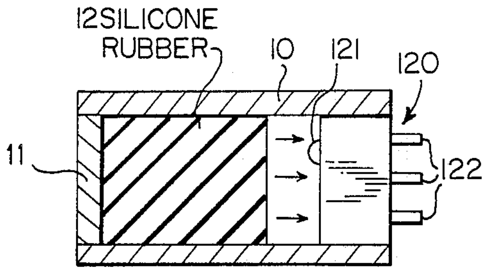
FIG. 8 is a cross-sectional view of a thermal switch which represents a third embodiment of the present invention and which is in an off state.
Figure 9:
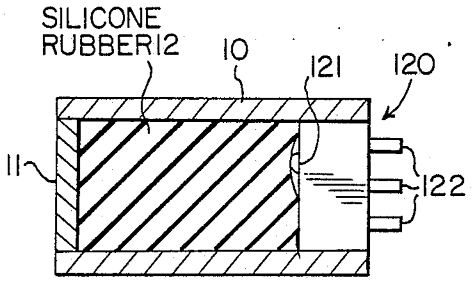
FIG. 9 is a cross-sectional view of the thermal switch shown in FIG. 8 when it is in an on state.

FIGS. 8 and 9 show a third embodiment of the present invention in which the same components as those in the above embodiments are indicated by the same reference numerals. This arrangement also has a tubular heat-conductive case 10, and a heat-conductive base plate 11 is connected to one end of the heat-conductive case 10.

The heat-conductive case 10 is filled with silicone rubber 12 which has the above-described characteristics and which is supported by the base plate 11.

A microswitch 120 which serves as an operation unit is attached to the other end of the heat-conductive case 10. The microswitch 120 has an actuator, e.g., a pushbutton which is located within the range of expansion of the silicone rubber 12, and terminals 122.

The operation in accordance with this embodiment will be described below with reference to FIGS. 8 and 9. As the outside temperature rises so that the temperature of the silicone rubber 12 is increased by the heat conducted through the base plate 11 and the heat-conductive case 10, the silicone rubber 12 gradually expands so as to become closer to pushbutton 121 of the microswitch 120, and then presses the pushbutton 121, thereby turning on the microswitch 120. As the outside temperature decreases, the temperature of the silicone rubber also decreases so that the silicone rubber 12 contracts and is detached from the pushbutton 121 of the microswitch 120, thereby turning off the microswitch 120.

In this embodiment, the moving section of the thermal switch includes no mechanically moving parts, and the silicone rubber 12 having elasticity and thermally expansible and contractible properties is directly brought into contact with and pressed against the pushbutton 121 of the microswitch 120 in a surface-contact manner so that the contacts in the body of the microswitch are separated from the silicone rubber, thereby preventing any imperfect contact and ensuring positive operation of the thermal switch.

Figure 10:
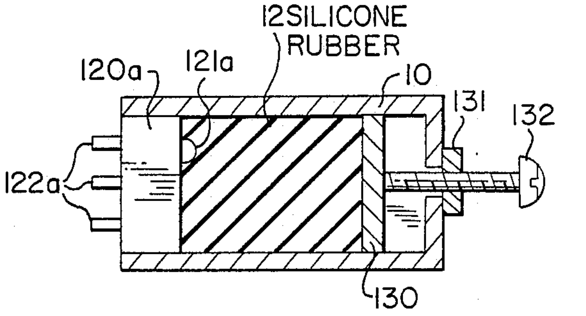
FIG. 10 is a cross-sectional view of a thermal switch which represents a fourth embodiment of the present invention and which is in an off state.
Figure 11:
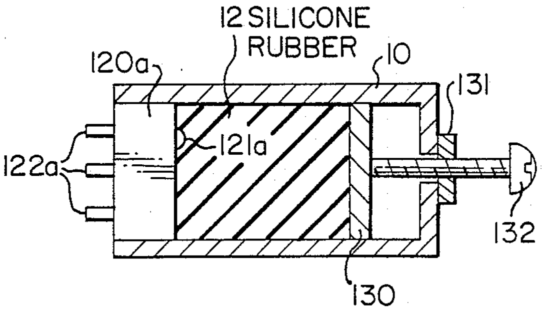
FIG. 11 is a cross-sectional view of the thermal switch shown in FIG. 10 when it is in an on state.

FIGS. 10 and 11 are cross-sectional views which illustrate a part of a fourth embodiment of the present invention and in which the same components as those in the above-described embodiments are indicated by the same reference numerals. This arrangement has a heat-conductive case 10 whose one end is closed and whose other end is opened, and silicone rubber 12 of the above-described type which fills a space in the case 10 so as to cover an actuator of a microswitch to be described later and the surface thereof in which the actuator is disposed.

This arrangement includes a pressing portion for applying an adjustable pressure to the silicon rubber, which includes a pushing plate 130 adapted to apply pressing force to the silicone rubber 12, a nut 131 fixed to the outside of the close end of the case 10 and, an adjusting screw 132 which is adapted for changing the pressing force of the pushing plate 130 and which passes through the case 10 and is screwed into the nut 131. One end of the screw 132 is in contact with the pushing plate 130. The pushing plate 130, the nut 131 and the adjusting screw 132 constitute a pressurizing unit. A switching device **120*a*, e.g., a microswitch is fixed to the open end of the case 10. The microswitch 120*a* has an actuator, e.g., a pushbutton 121*a*, and terminals 122*a*. The silicone rubber 12 fills the space which is formed between the pushing plate 130 and the microswitch 120*a***.

The operation in accordance with the fourth embodiment of the present invention will be described below with reference to FIGS. 10 and 11. As the outside temperature rises so that the temperature of the silicone rubber 12 is increased by the heat conducted through the case 10, the silicone rubber 12 gradually presses the pushbutton **121*a* of the microswitch 120*a* while expanding in the space filled with the rubber, thereby turning on the microswitch 120. As the outside temperature decreases, the temperature of the silicone rubber 12 also decreases so that the silicone rubber 12 gradually contracts and weakens the pressing force applied to the pushbutton 121*a* of the microswitch 120*a*, thereby turning off the microswitch 120*a***.

In this embodiment, if the adjusting screw 132 is tightened, the pushing plate 130 moves in the direction of approach to the microswitch 120, that is, it moves so as to increase the pressing force applied to the silicone rubber 12, and the silicone rubber 12 which has a certain degree of rubber elasticity can press the pushbutton 121 of the microswitch **120*a* at a pressure low enough to evade the on state of the microswitch 120*a*. It is therefore possible to actuate the thermal switch at a low set temperature. If the adjusting screw 132 is unscrewed to be moved in the direction of the outside of the close end of case 10, the pushing plate 130 moves in the direction of detachment from the microswitch, that is, it moves so as to weaken the pressing force applied to the silicone rubber 12, and the silicone rubber 12 acts to reduce the pressure which has been applied to the pushbutton 121*a***, thereby enabling the thermal switch to be actuated at a high set temperature.

Figure 12:
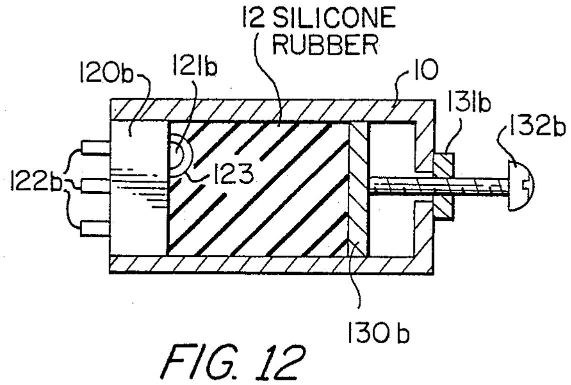
FIG. 12 is a cross-sectional view of a thermal switch which represents a fifth embodiment of the present invention and which is in an off state.

A fifth embodiment of the present invention will now be described below with reference to FIGS. 12 and 13. The difference between this embodiment and the fourth embodiment resides in that the former has a space 123 which is formed in the silicone rubber along the outer periphery of the pushbutton **121*b* of the microswitch 120*b*. In this embodiment, when the outside temperature rises and the temperature of the silicone rubber is increased by the heat conducted through the case 10, the silicone rubber 12 expands in the manner of cubical expansion, and the space 123 formed in the silicone rubber 12 thereby contracts so that the silicone rubber 12 is gradually brought close to and pressed against the pushbutton 121*b* of the microswitch 120*b*, thereby turning on the microswitch 120*b*. When the outside temperature decreases, the temperature of the silicone rubber 120*b* also decreases and, therefore, the silicone rubber 12 contracts in the direction of detachment from the pushbutton 121 of the microswitch 120*b* so as to gradually form the space 123, thereby turning off the microswitch 120*b***.

The fifth embodiment is designed to provide the above-described space 123, thereby enabling a wide range of change in temperature. Other constructions, operations and effects are the same as those in the first embodiment.

FIGS. 14 and 15 show another possible arrangement in which the microswitch **120*c* is fixed in an internal space of the case 10 which is closed by a heat-conductive base plate 11*a* at the opposite end. The microswitch can be operated by silicone rubber 12 which encircles the microswitch and fills the internal space of the case 10**.

In the above-described embodiments, the adjusting screw enables the pushing plate **130*c* to be in intimate contact with the silicone rubber 12 so that no gap is formed between the microswitch 120*c* and the silicone rubber 12 or between the case 10 and the silicone rubber 12 during the time when the silicone rubber expands. Therefore, the silicone rubber 12 positively and directly presses the pushbutton 121*c* of the microswitch 120*c* at a set temperature, thereby ensuring that the thermal switch can operate with a high degree of accuracy. It is also possible to select the set value of the sensing temperature by turning the adjusting screw so as to change the pressing force applied from the pushing plate 130*c* to the silicone rubber 12**.

Various modifications of the operation unit are possible so long as they can operate in response to the expansion and contraction of the silicone rubber. For instance, a pair of terminals may be provided at one end of the case 10 while disposing an elastic and electrically-conductive contact piece in a position spaced apart from these terminals so that the pair of terminals can be electrically connected when the contact piece is bent by virtue of the expansion of the silicon rubber.

What is claimed is:

1. A temperature sensing element comprising: a tubular heat conductive case; a heat conductive base plate fixed to one end of a chamber of said case; silicone rubber means supported by said base plate, said silicone rubber means having a positive coefficient of thermal expansion and expansion and contraction characteristics which are linear with respect to changes in temperature; and a microswitch fixed to the other end of said chamber in said case and having an actuator located within the range of expansion of said silicone rubber.

2. A temperature sensing element for operating at a predetermined set temperature comprising: a heat sensing portion including a heat conductive casing, said casing having an axially movable push plate, silicone rubber disposed in said casing, said silicone rubber having a positive coefficient of thermal expansion and expansion and contraction characteristics which are linear with respect to changes in temperature; an operating portion disposed within the range of expansion of said silicone rubber and adapted to be operated by thermal expansion and contraction of said silicone rubber; and means for adjusting the axial position of said axially movable plate for changing the pressure on said silicone rubber and thereby change the set temperature of said temperature sensing element.

3. A temperature sensing element according to claim 2, wherein said operating portion includes a microswitch and a space is provided between said silicone rubber and the outer periphery of an actuator of said microswitch.

4. A temperature sensing element according to claim 3 wherein said microswitch is embedded within said silicone rubber.

5. A temperature sensing element according to claim 3 wherein said microswitch is substantially completely embedded in said silicone rubber.

6. A temperature sensing element for operating at a predetermined set temperature comprising a tubular heat conductive caśe; an axially movable push plate disposed at one end of said case; silicone rubber means supported in said tubular case by said push plate, said silicone rubber means having a positive coefficient of thermal expansion and expansion and contraction characteristics which are linear with respect to changes in temperatures; a microswitch fixed to the other end of said case and having an actuator located within the range of expansion of said silicone rubber; and, means for adjusting the axial position of said axially movable push plate for changing the pressure on said silicone rubber and thereby change the set temperature of said temperature sensing element.

7. A temperature sensing element according to claim 6 wherein said microswitch is substantially completely embedded in said silicone rubber.

* * * * *